US011167223B2

(12) United States Patent
Sparke

(10) Patent No.: US 11,167,223 B2
(45) Date of Patent: Nov. 9, 2021

(54) DEVICE FOR IMPROVING WATER QUALITY

(71) Applicant: One Water Naturally Pty. Ltd, Frenchs Forest (AU)

(72) Inventor: David Sparke, Frenchs Forest (AU)

(73) Assignee: One Water Naturally Pty, Ltd, Frenchs Forest (AU)

( * ) Notice: Subject to any disclaimer, the term of this patent is extended or adjusted under 35 U.S.C. 154(b) by 0 days.

(21) Appl. No.: 16/625,215

(22) PCT Filed: Jun. 22, 2018

(86) PCT No.: PCT/AU2018/050627
§ 371 (c)(1),
(2) Date: Dec. 20, 2019

(87) PCT Pub. No.: WO2018/232466
PCT Pub. Date: Dec. 27, 2018

(65) Prior Publication Data
US 2020/0139268 A1    May 7, 2020

(30) Foreign Application Priority Data
Jun. 23, 2017   (AU) .................... 2017902424

(51) Int. Cl.
*B01D 21/00*      (2006.01)
*B01D 21/26*      (2006.01)
*B01D 21/24*      (2006.01)

(52) U.S. Cl.
CPC ..... *B01D 21/0006* (2013.01); *B01D 21/0009* (2013.01); *B01D 21/0042* (2013.01);
(Continued)

(58) Field of Classification Search
CPC .......... C01F 2103/001; B01D 21/0009; B01D 21/003; B01D 21/0042; B01D 21/0087
See application file for complete search history.

(56) References Cited

U.S. PATENT DOCUMENTS 4,983,295 A * 1/1991 Lamb .................... B01D 21/10
                                                    210/521
5,518,631 A * 5/1996 Maeda
(Continued)

FOREIGN PATENT DOCUMENTS

EP           2431333 A2 *   3/2012   .......... B01J 20/3295

OTHER PUBLICATIONS

International Search Report for PCT Application No. PCT/AU2018/050627, dated Aug. 13, 2018, in 3 pages.
(Continued)

*Primary Examiner* — Bradley R Spies
(74) *Attorney, Agent, or Firm* — Knobbe, Martens, Olson & Bear, LLP

(57) ABSTRACT

Disclosed herein is a device for improving water quality, said device comprising: an inlet for inflow of liquid into the device; a hydraulic circuit for receiving liquid from the inlet, the hydraulic circuit comprising at least a first tank and a second tank, wherein the first tank is upstream of the second tank and wherein one of said first and second tanks is nested within the other of said first and second tanks; an outlet at a downstream end of the hydraulic circuit for discharge of liquid from the device; one or more contaminant separation elements in the hydraulic circuit for separation of contaminants from liquid passing therethrough using at least one of: gravitational separation; sized-based filtration; chemical separation; magnetic separation; electrolytic separation; and adsorption or attraction-based separation, wherein the first tank is a settlement tank for gravitational settlement of contaminants from the liquid.

11 Claims, 7 Drawing Sheets

(52) U.S. Cl.
CPC ...... *B01D 21/0087* (2013.01); *B01D 21/2411* (2013.01); *B01D 21/265* (2013.01); *B01D 2221/12* (2013.01)

(56) References Cited

U.S. PATENT DOCUMENTS

| | | | |
|---|---|---|---|
| 5,976,374 A * | 11/1999 | Cameron | |
| 6,780,310 B1 * | 8/2004 | Howe | B01D 17/00 |
| | | | 210/155 |
| 2004/0055950 A1 * | 3/2004 | Bryant | B01D 21/0042 |
| | | | 210/521 |
| 2005/0077248 A1 | 4/2005 | Stark et al. | |
| 2007/0108122 A1 | 5/2007 | Andoh et al. | |
| 2014/0001120 A1 * | 1/2014 | Jowett | C02F 1/463 |
| | | | 210/615 |
| 2016/0160489 A1 * | 6/2016 | Garbon | B01D 21/0006 |
| | | | 210/170.03 |
| 2018/0111852 A1 * | 4/2018 | Rauch | B01D 17/12 |

OTHER PUBLICATIONS

Written Opinion for PCT Application No. PCT/AU2018/050627, dated Aug. 13, 2018, in 4 pages.

\* cited by examiner

DEVICE FOR IMPROVING WATER QUALITY

CROSS-REFERENCE

This application is the U.S. National Phase under 35. U.S.C. § 371 of International Application PCT/AU2018/050627, filed Jun. 22, 2018, which claims priority to Australian Patent Application No. 2017902424, filed Jun. 23, 2017. The disclosures of the above-described applications are hereby incorporated by reference in their entirety.

TECHNICAL FIELD

The present disclosure relates to a device for improving water quality. The device has been developed primarily for removing pollutants, such as gross pollutants, organic waste, silt, sediment, nutrients including phosphorous and nitrogen, along with hydrocarbon material, such as oils, fats and the like, from rainwater and stormwater by separation and will be described hereinafter with reference to this application. However, it will be appreciated that the device is not limited to this particular application and may also be used for separating entrained materials from other liquids, such as for separating nutrients or diverting fertilisers from farm runoff, or for removing sediment or other pollutants from water discharged during processing or washing of various items, such as during washing of root vegetables, or for separating minerals from a slurry.

BACKGROUND

Various devices exist for removing pollutants, such as litter and sediment above 5 mm in size, from rainwater/stormwater runoff. Examples include the gross pollutant traps (GPTs) disclosed in AU2004100956 and WO2007/030735. However, known GPTs are configured for the separation of large pollutants in intense volume water flows and provide no removal, or at best very limited removal, of fine sediment and dissolved pollutants. Also, conventional GPTs contaminate the whole of the water flow to the highest level of any contamination passing through the system. Another problem with known GPTs is that settled contaminants in stormwater collected therein tend to be resuspended by subsequent stormwater inflow.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification the words "comprise" and "include", and variations such as "comprises", "includes", "comprising" and "including", will be understood to imply the inclusion of a stated element, integer or step, or group of elements, integers or steps, but not the exclusion of any other element, integer or step, or group of elements, integers or steps.

Among other things, disclosed herein is a device for improving water quality, said device comprising:

an inlet for inflow of liquid into the device;
a hydraulic circuit for receiving liquid from the inlet, the hydraulic circuit comprising at least a first tank and a second tank, wherein the first tank is upstream of the second tank and wherein one of said first and second tanks is nested within the other of said first and second tanks;
an outlet at a downstream end of the hydraulic circuit for discharge of liquid from the device;
one or more contaminant separation elements in the hydraulic circuit for separation of contaminants from liquid passing therethrough using at least one of: gravitational separation; sized-based filtration; chemical separation; magnetic separation; electrolytic separation; and adsorption or attraction-based separation, wherein the first tank is a settlement tank for gravitational settlement of contaminants from the liquid.

The device may be configured to facilitate generation of a vortex in the first tank. For example, a vortex facilitating formation, such as a vane extending into the tank or a groove or scallop in a sidewall of one of the first and second tanks, may be provided for the first tank. The inlet may direct inflowing liquid toward the vortex facilitating formation. Alternatively, or in addition, the inlet may be oriented substantially tangentially to a sidewall of the first tank to facilitate generation of the vortex.

An inner wall of said other of said first and second tanks may be defined by said one of said first and second tanks. Said one of said first and second tanks may be the second tank and said other of said first and second tanks may be the first tank.

A top of the first tank may be open or substantially closed. In embodiments where the top is substantially closed, the first tank may have a port near the top through which liquid can escape in the event of a blockage in the device and/or which may provide an access opening into the device for commissioning and maintenance and/or which may allow surface runoff to enter the device. At least one barrier for restricting personal entry, especially by children, into the device via the relief port may extend partly or completely over the port. The barrier may, for example, comprise a grate and/or cap. The barrier may be immovably connected to the device, or may be movable between a closed configuration for restricting personal entry and an open configuration for providing access into the device, such as by being hingedly connected or removably connected to the device, and a security mechanism such as a lock may be associated with the barrier to releasably secure the barrier in the closed configuration. The first tank may be substantially annular and may comprise an outer wall and an inner wall. The inner wall of the first tank may be defined by the second tank. A base of the second tank may be spaced above a base of the first tank. A conduit may extend into the first tank, the conduit having a first end at the top of the first tank and a second end positioned in a lower portion of the first tank. The second tank may be substantially annular and may comprise an inner wall. The inner wall of the second tank may be defined by the conduit. A relief port may be provided in the conduit in an upper portion of the second tank to allow liquid to flow from the first tank up through the conduit and into the second tank via the relief port in the event of a blockage in the device. Contaminants that settle on the base of the first tank may be extracted through the conduit. A base of the second tank may be spaced above a base of the first tank. A base of the first tank may be sloped, and may for example by conical, to direct contaminants that settle thereon toward a desired discharge or collection zone.

The device may comprise one or more hydrocarbon traps. The one or more hydrocarbon traps may comprise a first hydrocarbon trap located upstream of the second tank. The first hydrocarbon trap may be formed by positioning an upstream end of a fluid flow passageway extending between the first and second tanks below an invert level of the outlet. The fluid flow passageway may comprise an opening in a wall between the first and second tanks. The opening may be located at the bottom of the wall between the first and second tanks. The base of the second tank, or at least the portion of the base of the second tank near the opening, may slope toward the opening to facilitate backflow of materials that settle thereon into the first tank. The opening may be provided in a radially inwardly recessed section of the wall. The one or more contaminant separation elements may comprise a filter extending over the recessed opening substantially flush with a non-recessed section of the wall. This filter may be a relatively coarse filter for removing relatively large pollutants from the liquid.

The one or more contaminant separation elements may comprise a first relatively coarse filter for removing relatively large pollutants from the liquid and a second relatively fine filter for removing relatively fine pollutants. The first filter may be located upstream of a second filter. The first filter may have openings therein configured to capture pollutants sized greater than 5 mm. The second filter may have openings therein configured to capture pollutants sized greater than 0.5 mm to 1 mm. The first filter may be located between the inlet and an upstream end of the second tank, for example adjacent an upstream end of a fluid flow passageway extending between the first and second tanks. The second filter may be located between the upstream end of the second tank and the outlet, for example adjacent a downstream end of a fluid flow passageway extending between the first and second tanks. A liquid directing formation, such as a directional weir or baffle, may be provided to direct liquid to flow through the respective filter.

The device may comprise one or more magnetic separator. The one or more magnetic separator may be located in the first tank, the second tank or both the first and second tanks.

The device may comprise one or more element for generating ferrous oxide (FeO). The one of more element may comprise a pad of ferric metal fibres, for example a pad of steel fibres, which may be contained in a porous housing. The one or more element may be located in the second tank.

The first and second tanks may be manufactured separately, for example by plastics moulding, prior to said one of the tanks being nested inside the other. Without said one of the tanks nested therein, the other tank may be used as a liquid storage tank or be reconfigured with different interior components for use as a different device, such as a gross pollutant trap.

The device may comprise a wash pipe with an outlet for discharging water inside said other of the tanks and onto an outer surface of said one of the tanks.

A port may be provided in a base of said other of said first and second tanks. This port may have a diameter that is substantially less than that of said inlet and outlet.

Also disclosed herein is a method of improving water quality using the apparatus defined in paragraph [0006] above, wherein the apparatus may comprise any one or more of the features defined in paragraphs [0007] to [0016] above.

BRIEF DESCRIPTION OF DRAWINGS

A water quality improvement device embodying principles disclosed herein will now be described, by way of example only, with reference to the accompanying drawings, in which.

DESCRIPTION OF EMBODIMENTS

Figure 1:
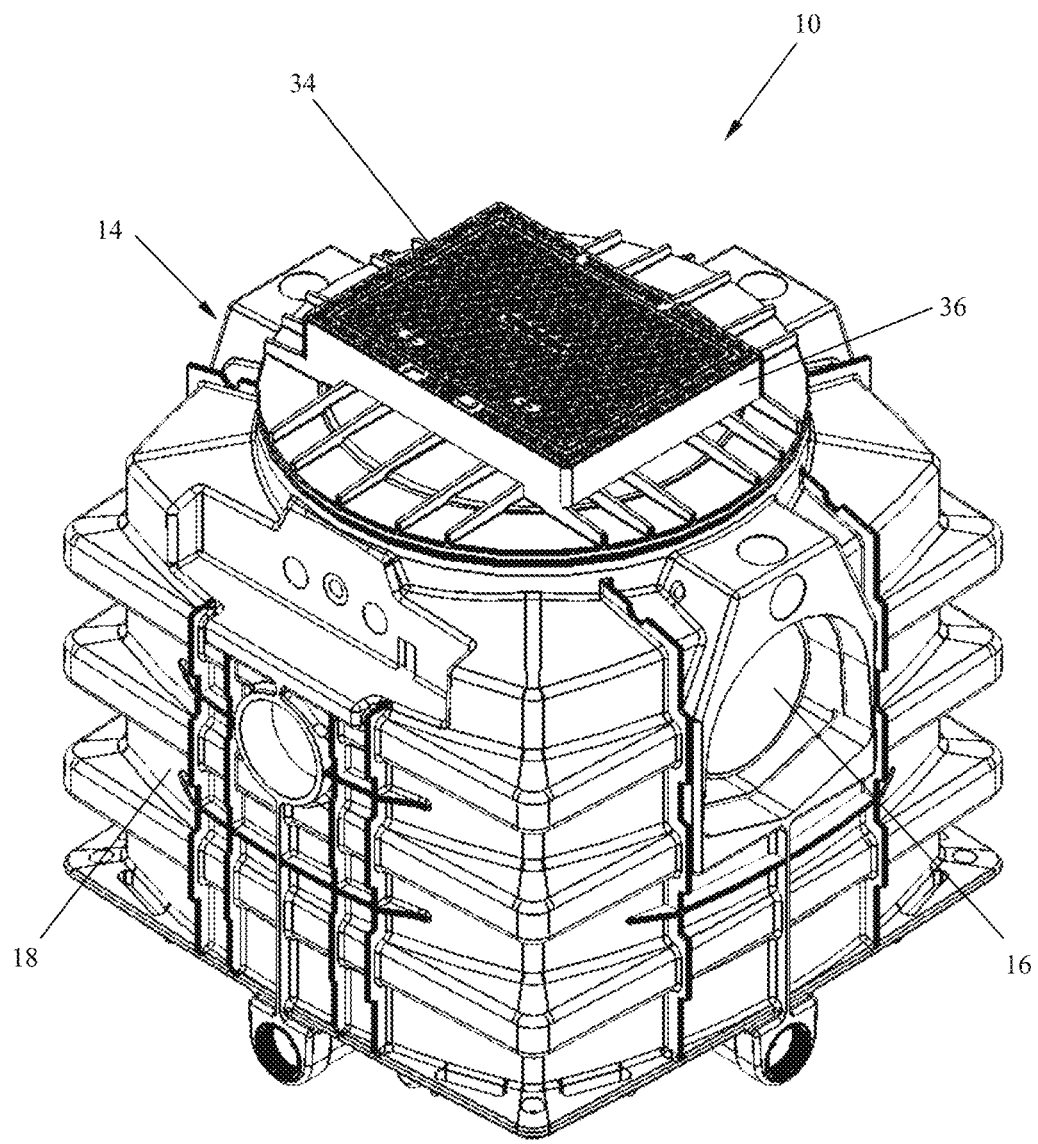
FIG. 1 is a perspective view of an embodiment of a water quality improvement device according to the present disclosure.
Figure 2:
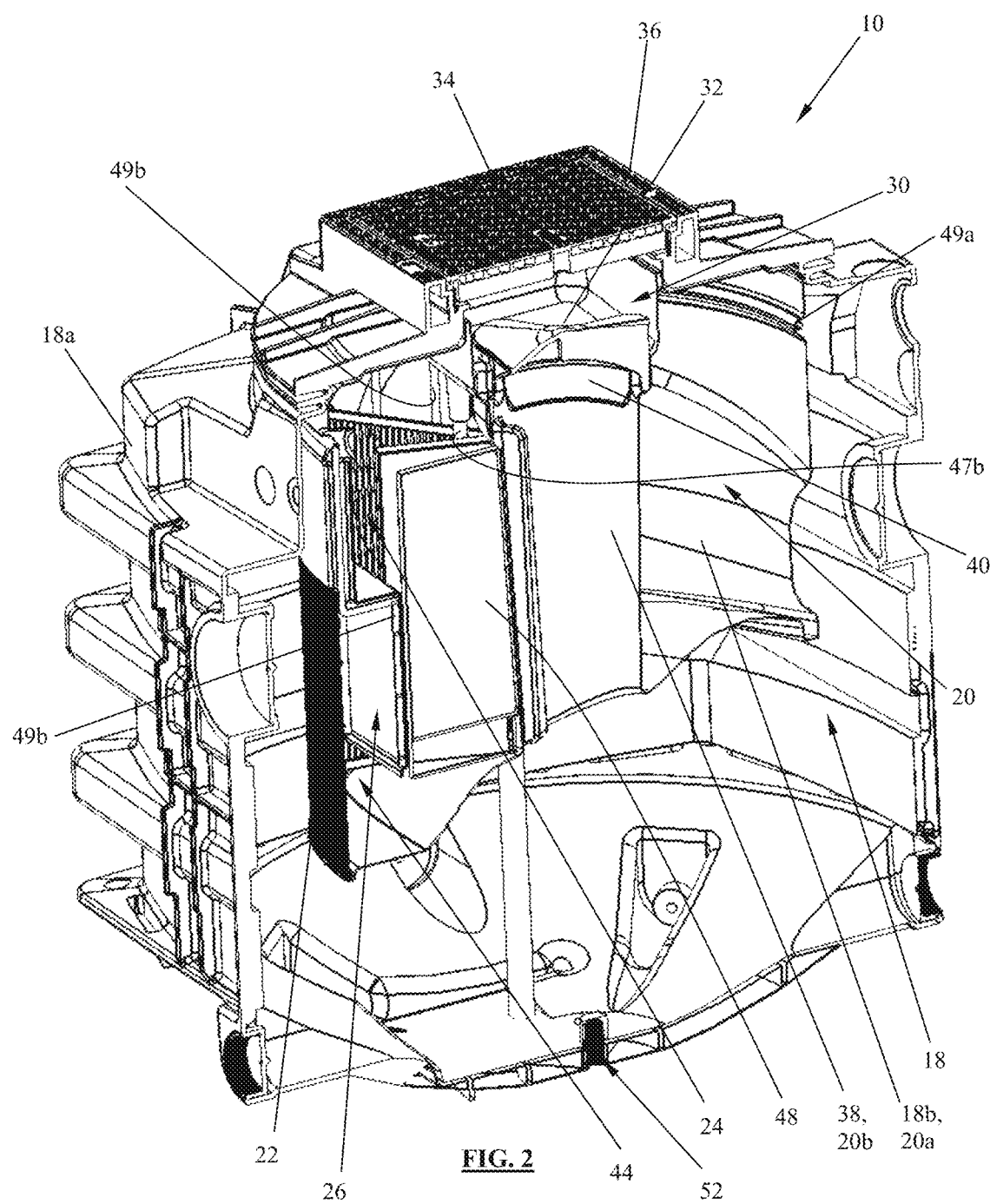
FIG. 2 is a cross sectional view taken vertically through the device in plane 2-2 of FIG. 5.
Figure 3:
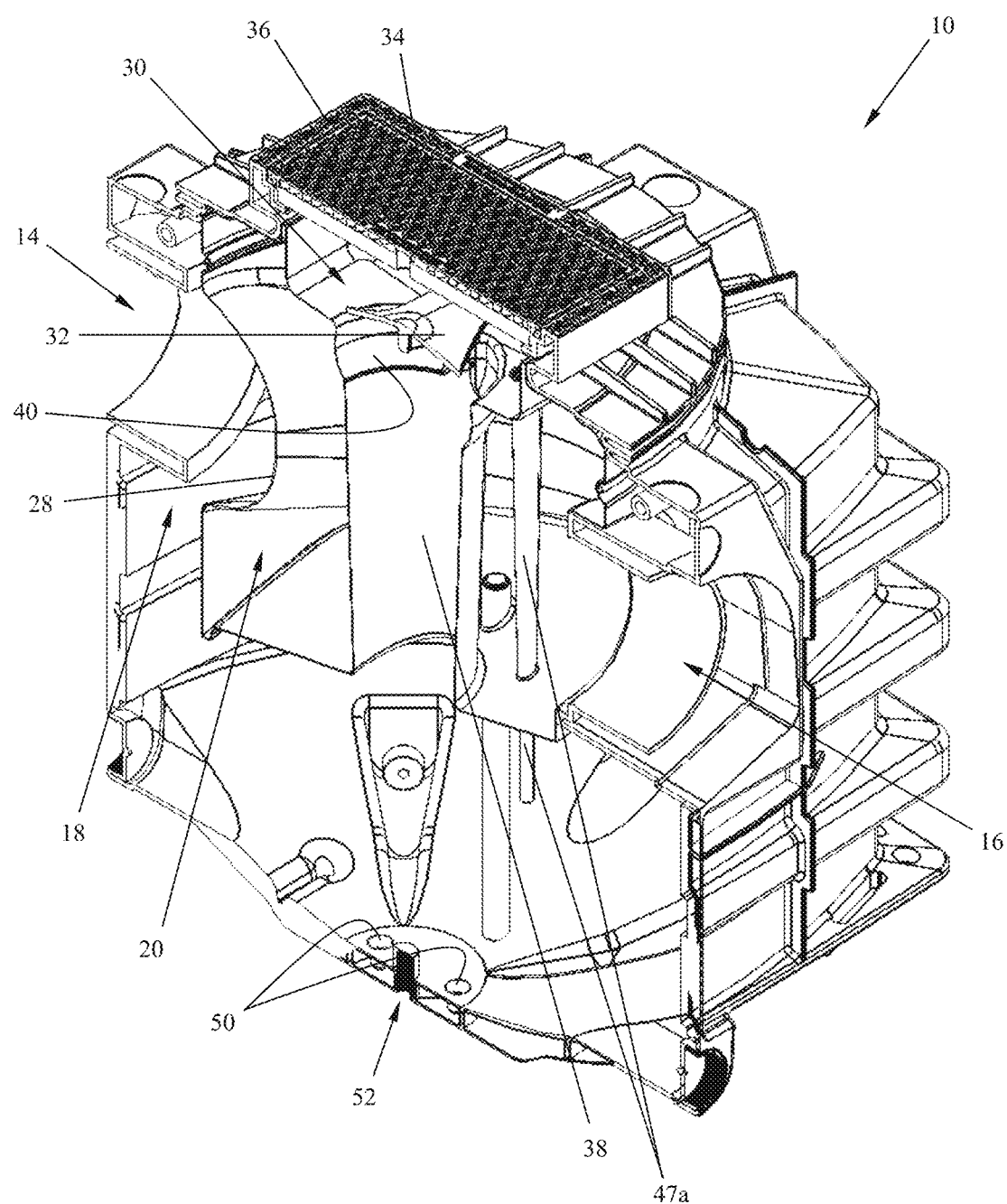
FIG. 3 is a cross sectional view taken vertically through the device in plane 3-3 of FIG. 5.
Figure 4:
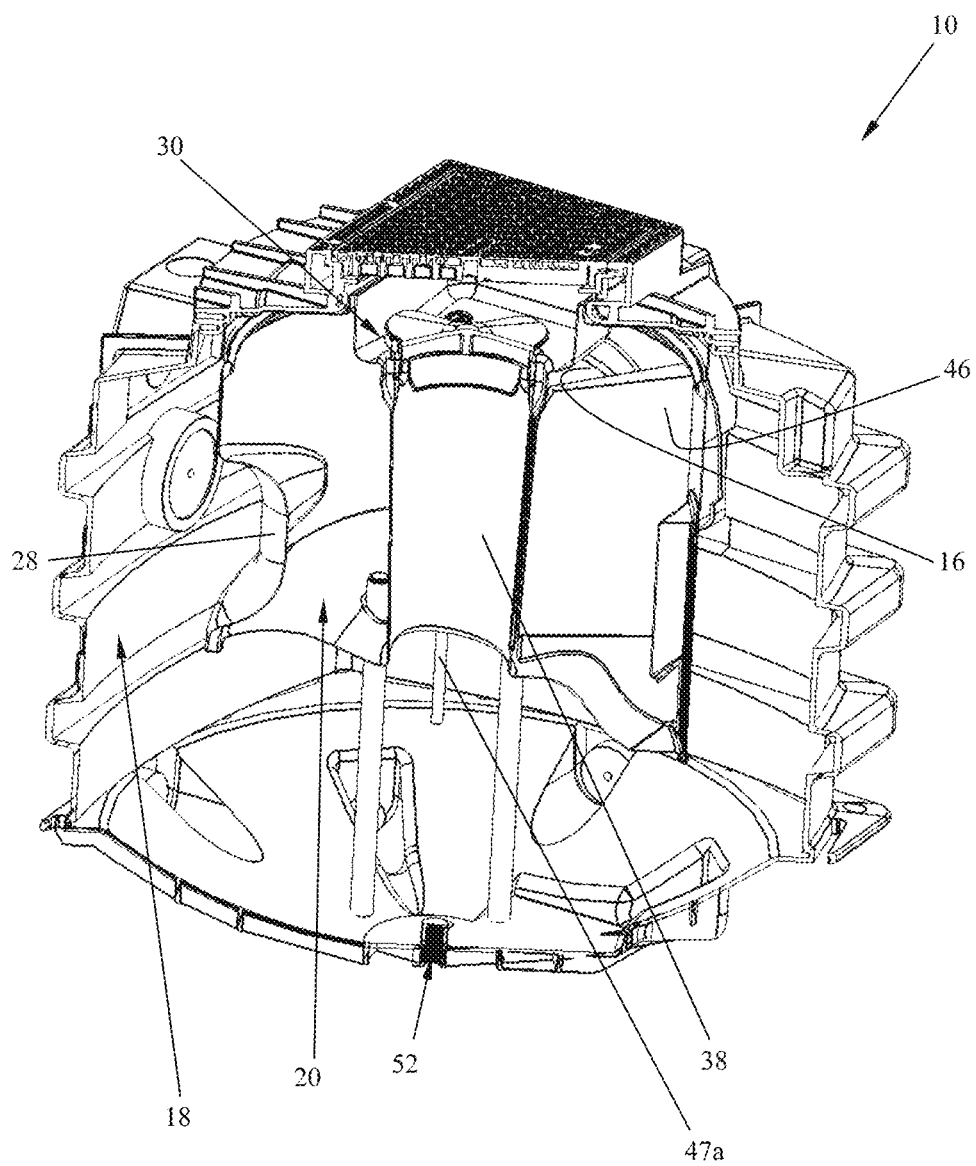
FIG. 4 is a cross sectional view taken vertically through the device in plane 4-4 of FIG. 5.
Figure 5:
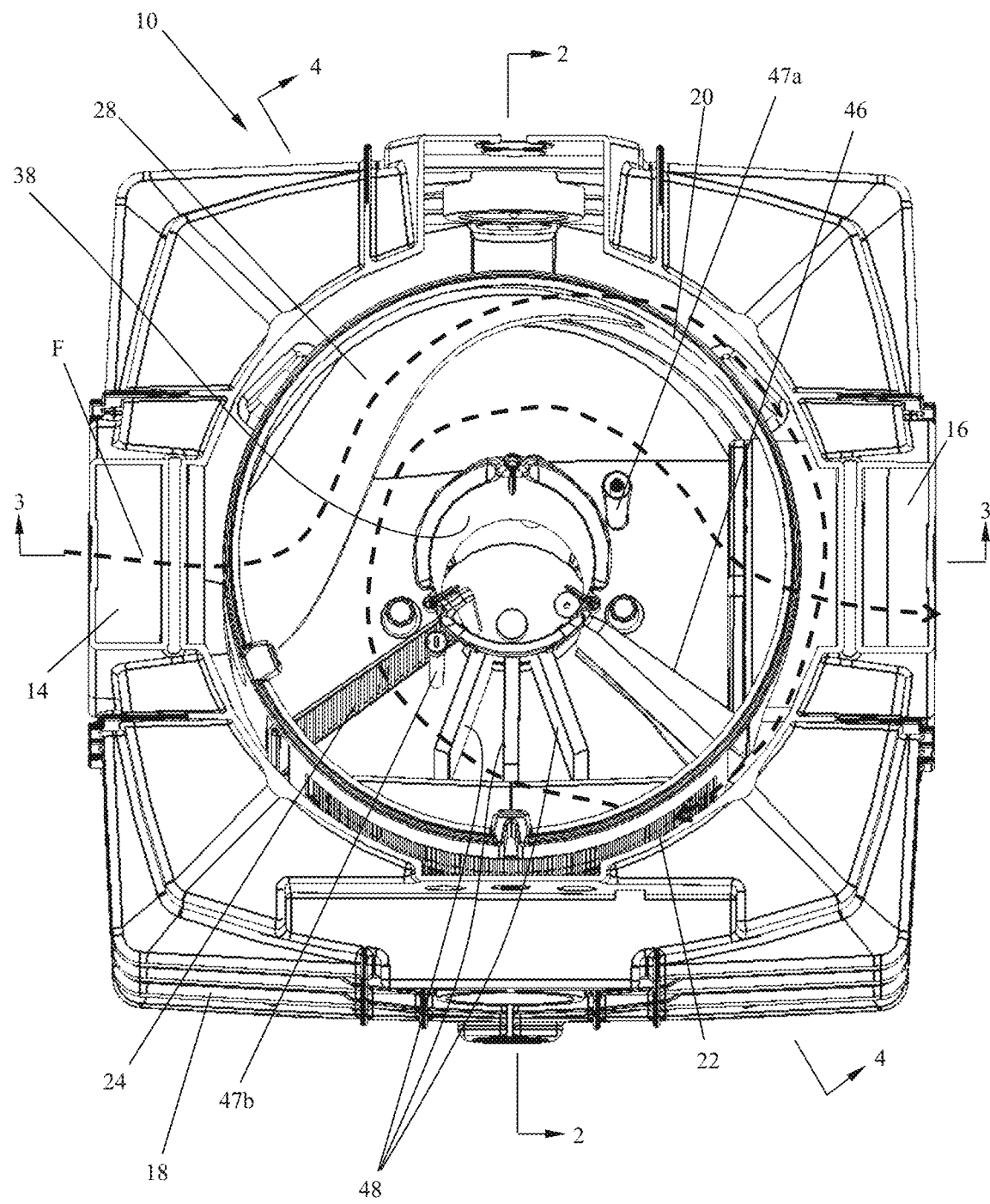
FIG. 5 is a cross sectional view taken horizontally through the device of FIG. 1 just below the level of cap 32.

Referring to the drawings, there is shown a device 10 for improving water quality. The device 10 comprises a hydraulic circuit defining a fluid flow path F extending between an inlet 14 for inflow of water and an outlet 16 for the discharge of water from the device. The hydraulic circuit comprises an upstream first tank 18 and a downstream second tank 20. The second tank 20 is nested inside the first tank 18, with a base of the second tank being spaced above the base of the first tank. The tanks 18, 20 are substantially cylindrical, with the outer wall 20*a* of the second tank defining the inner wall 18*b* of the first tank, such that the first tank 18 comprises an annular chamber surrounding the second tank 20. Filters 22, 24 for size-based filtering of contaminants from the water, along with a hydrocarbon trap 26, are provided in the hydraulic circuit and will be described in more detail below.

The first tank 18 is a settlement tank for gravitational settlement of contaminants from the water. This gravitational settlement is enhanced by generating a vortex in the first tank 18. Formation of the vortex is facilitated by the inlet 14 directing inflowing water toward a vortex generating formation 28, in the form of a scalloped surface on the exterior surface of outer wall 20*a* of the second tank 20. In some embodiments, the inlet 14 may instead or in addition be oriented substantially tangentially to the inner 18*b* and outer 18*a* walls of the first tank 18 to facilitate generation of the vortex.

A port 30 is provided in the top of the device 10. Port 30 provides an access opening into the device 10 for commissioning and maintenance, and also allows runoff water to inflow into the device 10. A cap 32 extends over port 30 for restricting personal entry, especially by children, into the device 10 via the relief port. The cap 32 is movable between a closed configuration for restricting personal entry and an open configuration for providing access into port 30, such as by being hingedly connected or removably connected to the device, and a security mechanism such as a lock may be associated with the cap 32 to releasably secure it in the closed configuration. A grate 34 is also provided over port 30 and the cap 32. The grate 34 is seated in a recessed rim 36 at the upper end of the device 10, such that the top of the grate 34 is flush with the top of the rim 36. When the device 10 is buried, it is typically buried at a depth selected such that the grate 34 and rim 36 finish flush with the ground surface. In some embodiments, the tops of tanks 18, 20 may be below the ground surface and a riser may extend from the tanks to the ground surface. The grate 34 may be sufficiently strong to carry vehicular traffic.

A conduit 38 extends from port 30, through the second tank 20 and into a lower portion of the first tank 18. The conduit 38 defines inner wall 20b of the second tank, such that the second tank comprises a substantially annular chamber. A relief port 40 is provided in the conduit 38 in an upper portion of the second tank 20 to allow liquid to flow from the first tank 18 up through the conduit 38 and into the second tank 20, bypassing the filters 22, 24, in the event of a blockage in or overcapacity of the device 10. Contaminants that settle on the base of the first tank 18 may be extracted via a vacuum hose inserted through the conduit 38. The base of the first tank 18 is substantially conical to direct contaminants that settle thereon toward a central collection zone underneath the conduit 38. The conical shape of the base of tank 18, along with the provision of ribs in the walls and base of tank 18 also improves the structural strength of the tank.

Hydrocarbon trap 26 is located upstream of the second tank 20 and is formed by positioning a crown level of the fluid flow passageway 44 connecting the first 18 and second tanks 20 below the invert level of outlet 16. Hydrocarbons caught by the trap 26 float to the top of the first tank 18 and are trapped therein instead of passing into the second tank 20 through the submerged fluid flow passageway 44. The fluid flow passageway 44 is also below the invert level of the outlet 16. In the illustrated embodiment, the fluid flow passageway 44 comprises an opening in a radially inwardly recessed section at the bottom of wall 18b, 20a between the first and second tanks. The base of the second tank 20, or at least the portion of the base of the second tank near the opening 44, slopes toward the opening 44 to facilitate backflow of materials that settle thereon into the first tank 18.

Filter 22, which takes the form of a grate with vertical bars, extends over an upstream side of the opening 44 substantially flush with a non-recessed section of the wall 18b, 20a. Filter 22 is a relatively coarse filter, having openings therein configured to capture pollutants sized greater than 5 mm from the water. Filter 24, which takes the form of a mesh screen, extends across tank 20 on a downstream side of opening 44. Filter 24 is a relatively fine filter, having openings therein configured to capture pollutants sized greater than 0.5 mm to 1 mm from the water. A liquid directing formation, such as a directional weir 46 or baffle, is provided in the second tank 20 to direct liquid to flow through filter 24 before reaching outlet instead of travelling the opposite way around tank 20 and thereby bypassing the filter 24. Weir 46 extends to a height above the crown of the outlet pipe 16.

Magnetic separators 47a, 47b are provided in tank 20. One of the magnetic separators 47a comprises a removable column that extends into tank 18, where it interacts with water flowing through device 10 without substantial disruption to the dynamics of the water flow. Magnetic separator 47a comprises an elongate rod around which a solid matrix comprising polyethylene (PE) and iron filings is formed. Magnetic separator 47a acts on multiple contaminates in the water flow, including hydrocarbons, ammonia (nitrogen), phosphorous and magnesium contaminates, and other dissolved or suspended contaminants. Magnetic separator 47b is located between opening 44 and filter 24. Magnetic separator 47b comprises a non-removable polyethylene (PE) tube, without iron impregnation in the PE, with an elongate magnet removably housed in the tube. Magnetic separator 47b facilitates removal of residual nutrients, such as nitrogen and phosphorous, and suspended sediment particles, before water flow through the device 10 passes filter 24. To reduce interference with water flow through the device, magnetic separator 47b is positioned close to the conduit 38.

Ideally, the magnetic field generated by magnetic separator 47b extends across the full width of the flow passage through the device 10. The magnetic separator 47a, and the elongate magnet of magnetic separator 47b, can be removed through port 30 when cleaning and maintenance is performed on the device 10. When the magnetic separator 47a is removed, its lower portion is drawn up through an opening in the base of tank 20. This opening is substantially the same size as the cross section of magnetic separator 47a, such that contaminates that have accumulated on the magnetic separator 47a will be scraped off as the magnetic separator 47a is drawn up through the opening in the base of tank 20 and fall into the base of the device 10 for removal by vacuum, with any remaining contaminants being cleaned off the magnetic separator 47a after it has been removed from the device 10. Similarly, when the elongate magnet is removed from magnetic separator 47b, it is expected that contaminates that have accumulated on the tube of magnetic separator 47b will either fall into the base of the device 10 for removal by vacuum or be cleaned off the tube during cleaning and maintenance of the device 10.

Elements, in the form of panels 48, for generating ferrous oxide (FeO) are provided between opening 44 and filter 24. The panels 48 comprise a porous housing filled with a pad of ferric metal fibres, for example a pad of "steel wool" fibres. FeO generated by the panels 48 chemically facilitates the removal of nutrient material, such as phosphorous, in water flowing through the device 10.

Figure 6:
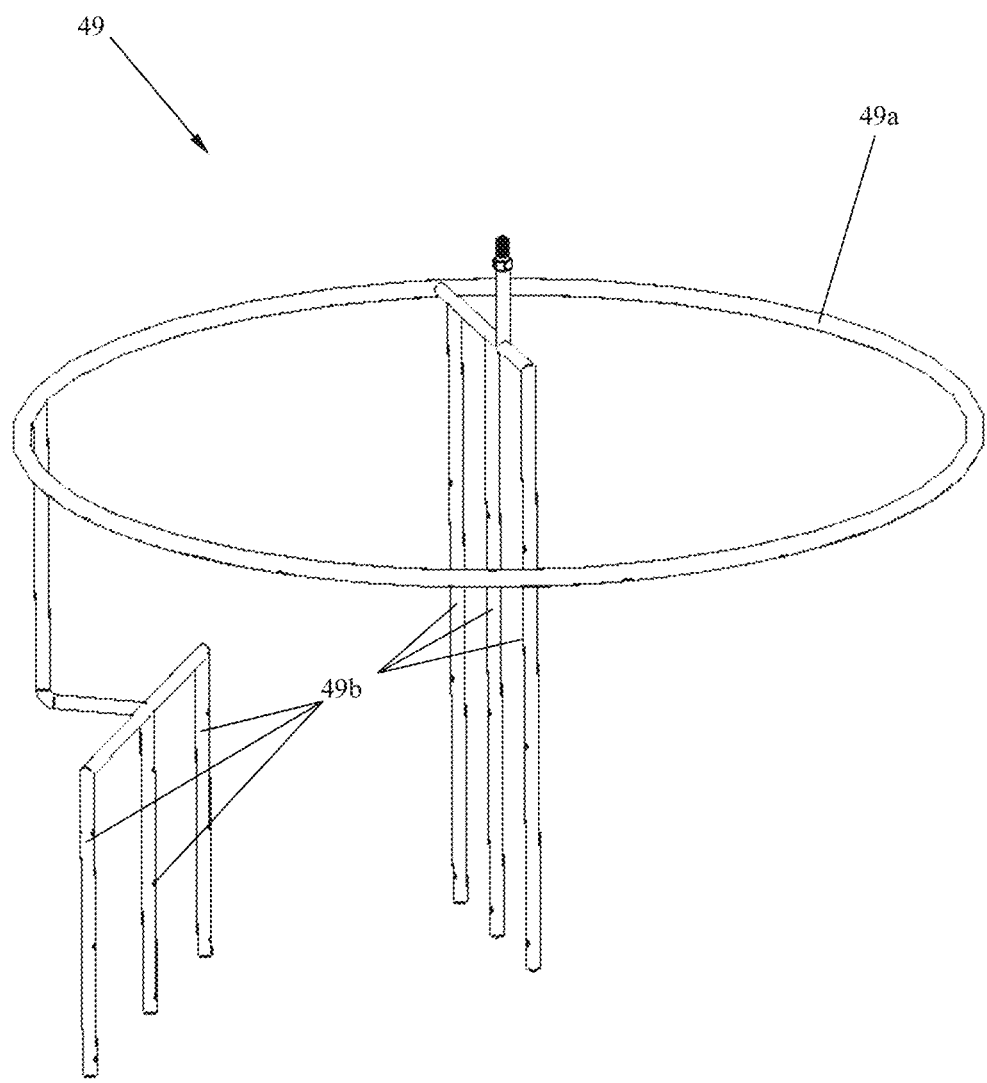
FIG. 6 is a perspective view of the wash system of the device of FIG. 1.

The device 10 includes a wash system 49 comprising a wash pipe 49a that extends circumferentially around the top of tank 20 and that has branch pipes 49b which extend over the filters 22, 24. FIG. 6 shows the wash system 49 in isolation, without other components of the device 10. The wash pipes 49a, 49b have nozzles for spraying water or pressurised air onto the outer surface of tank 20 and the filters 22, 24 to clean off contaminants that may accumulate thereon. The wash system may, for example, be connected to a mains water supply, a pressure water supply or to a source of compressed air.

It will be appreciated that the gradient features of the device 10 inhibit any escaping water or contaminated fluid flows by having the crown level of opening 44 below the invert level of outlet 16.

One or more low flow port 50 is provided in the base of tank 18 to allow slow drainage of the device 10 during periods of no flow or low flow through the device 10. In some embodiments, each port 50 is fitted with a one-way valve to prevent water entering the device 10 through port(s) 50. The diameter of each port 50 is substantially less than that of inlet 14 and outlet 16.

One or more reflux port 52, which may be provided with a one-way valve, is provided in the base of tank 18. The reflux port(s) 52 allow ground water to flow into tank 18 to reduce hydrostatic uplift forces on the device 10 in situations where the upper surface of the zone of saturation, or "water table", of earth surrounding the device 10 is above the base of tank 18.

Tanks 18, 20 may be manufactured separately, for example by plastics moulding, prior to tank 20 being nested inside tank 18. In some embodiments, a plastics moulded tank 20 may be installed in a pre-existing tank formed from concrete, composite plastics, such as fibre reinforced plastics, steel or any other suitable material, with the pre-existing tank acting as tank 18.

Without tank 20 nested therein, tank 18 may be used as a liquid storage tank. As such, tank 18 is manufactured with continuous sidewalls, and cutouts for the inlet 14 and outlet 16 are only made in the sidewalls if tank 18 is to have tank 20 installed therein to form device 10. Components of the device 10 can also be configured for use as a gross pollutant trap (GPT), in which case tank 20 is omitted from tank 18 and an outlet screen, such as a grate, is installed on a T-piece extending into tank 18 from outlet 16. In other embodiments, tank 18, without tank 20 nested inside it, may be reconfigured for use as an onsite detention (OSD) tank, or as a water transfer device by installing a pump lift configuration for elevating wastewater to a higher elevation for treatment or discharge to sewage infrastructure for other processing treatments. In yet further embodiments, instead of tank 20, nested inside tank 18 may be:

an aerated waste water treatment tank (AWTS) to provide a for sewage treatment processing device; or a "first flush" water quality improvement device, such as those disclosed in the applicant's co-pending Australian Patent Application No. 2016216678, the content of which is incorporated herein by way of reference.

Figure 7:
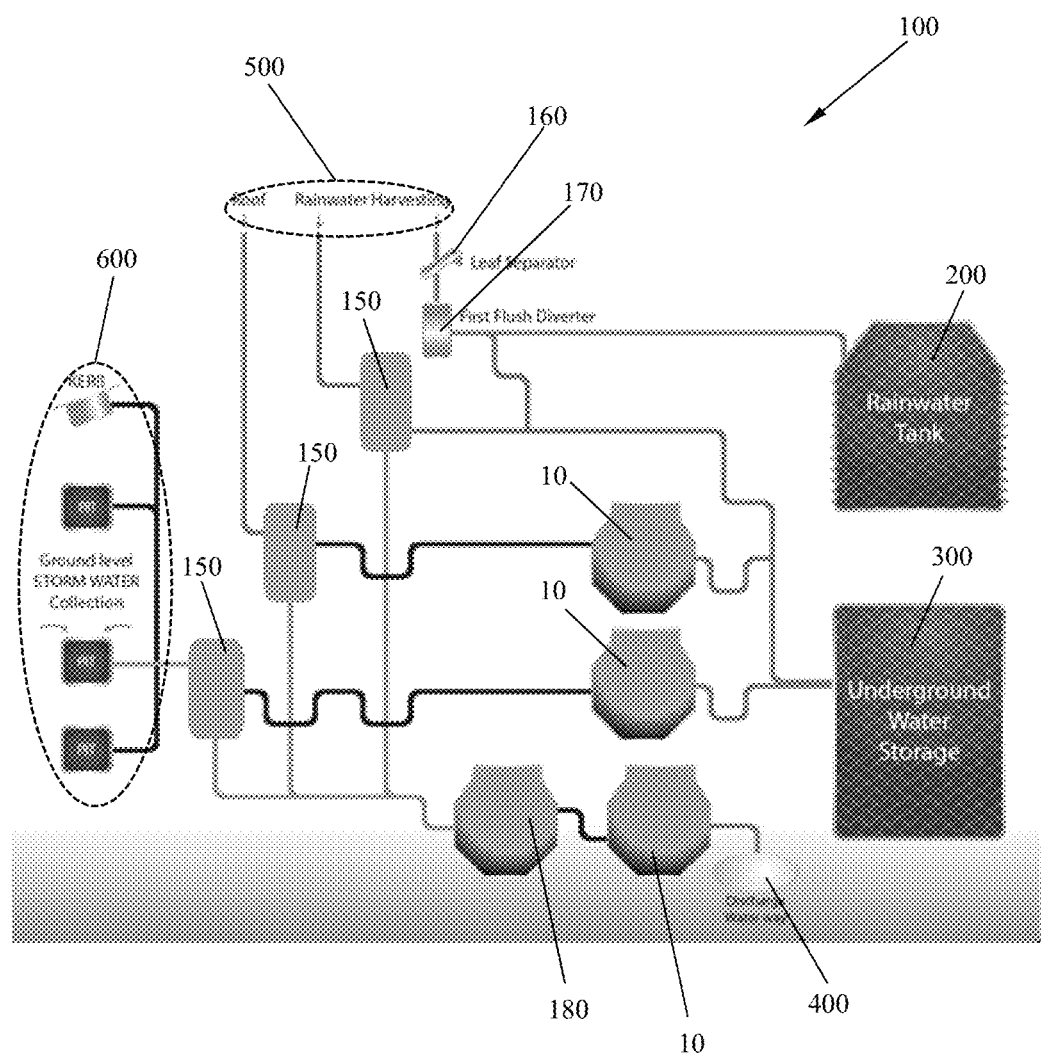
FIG. 7 is a schematic view of a micro-distributed system incorporating the device of FIG. 1.

FIG. 7 schematically illustrates various exemplary process streams in a micro-distributed point of capture system 100 that may incorporate device 10. The system 100 may also comprise a "first flush" water quality improvement device, such as a device 150 as disclosed in Australian Patent Application No. 2016216678. The process streams shown in FIG. 7 variously also comprise a roof guttering or downpipe screen 160 for removing leaves and other macro roof debris, a "first flush" diverter 170 for separating harvested water into a relatively clean portion and a relatively polluted portion, a gross pollutant trap 180, a rainwater tank 200 or other storage for reusable water, a water storage 300 (which may be underground) for further treatment, a discharge waterway 400, entry points 500 for water collected from rooftops or other relatively clean catchments, and entry points 600 for water collected from roadways of other relatively polluted catchments.

As shown in FIG. 7, water received from relatively clean catchments via entry points 500 may be passed through screen 160 and then through diverter 170, with the relatively clean portion of the water being diverted to rainwater tank 200 and the relatively polluted portion being diverted to storage 300. Alternatively, water harvested from relatively clean catchments may be passed through a device 150 and separated into a relatively clean portion for diversion directly, or via a device 10, to storage 300, and into a relatively polluted portion for diversion to a GPT 180 and then to a device 10 before discharge to a waterway 400. Water received from relatively polluted catchments via entry points 600 may be passed through a device 150 and separated into a relatively clean portion for diversion, via a device 10, to storage 300, and into a relatively polluted portion for diversion to a GPT 180 and then to a device 10 before discharge to a waterway 400. GPT 180 may be formed from tank 18, without a tank 20 installed therein, but with an outlet screen, such as a grate, installed on a T-piece extending into tank 18 from outlet 16.

It will be appreciated that use of devices 10 and 150 in system 100 facilitates collection and improvement of the quality of stormwater. More particularly, device 150 performs a combined "first flush" solids diversion and further solids separation to significantly reduce the contamination load from any catchment, prior to diverting the majority of the higher quality water to device 10 for finer filtration and pollutant removal. Higher cost treatment targeted at residual gross pollutants, such as heavy metals, is then confined to what is, after processing by devices 150 and 10, only a relatively small fraction of the original volume of water. Moreover, upstream "first flush" separation using device 150 facilitates a reduction of the gross pollutant load applied to device 10, such that it can thereby withstand a more intense flow and potentially operate for a longer period of a prolonged storm or other inflow event before maintenance and emptying is required. Use of a micro-distributed system, such as system 100, also facilitates energy savings, reduction in pollution effects, savings on drainage infrastructure spending, and provision of a high quality local usable water supply to significantly reduce high cost mains water demand. It will be appreciated that the number of devices 10 and 150 in system 100 can be increased or reduced as required to match the rainwater harvesting/detention capacity requirements of a catchment serviced by the system 100.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of possible modifications and/or variations include but are not limited to:

the vortex facilitating formation being a vane extending into the first tank 18 or one or more grooves in a sidewall of the first and/or second tanks 18, 20;

the first tank 18 may have an open top that extends above a normal operational water level in the first tank 18;

instead of being an opening at the base of wall 18b, 20a, the fluid flow passageway 44 may comprise a conduit extending through an opening higher up wall 18b, 20a, wherein a crown level of the upstream end of the conduit is below the invert level of the outlet 16; and/or replacing grate 34 with another form of cover, such as a lid, which may be threaded and/or sealingly engaged over port 30.

What is claimed is:

1. A device for improving water quality, said device comprising:

an inlet for inflow of liquid into the device;

a hydraulic circuit for receiving liquid from the inlet, the hydraulic circuit comprising at least a first tank and a second tank, wherein the first tank is upstream of the second tank, and wherein the first tank is nested within the second tank, and wherein an inner wall of the first tank is defined by the second tank, and wherein a base of the second tank is spaced above a base of the first tank;

an outlet at a downstream end of the hydraulic circuit for discharge of liquid from the device;

one or more contaminant separation elements in the hydraulic circuit for separation of contaminants from liquid passing therethrough using at least one of: gravitational separation; sized-based filtration; chemical separation; magnetic separation; electrolytic separation; and adsorption or attraction-based separation, the first tank being a settlement tank for gravitational settlement of contaminants from the liquid;

a vortex facilitating formation for generation of a vortex in the first tank;

one or more hydrocarbon traps, the one or more hydrocarbon traps comprising a first hydrocarbon trap located upstream of the second tank, the first hydrocarbon trap being formed by positioning an upstream end of a fluid flow passageway extending between the first and second tanks below an invert level of the outlet;

a first filter and a second filter, the first filter being a relatively coarse filter and the second filter being a relatively fine filter, wherein the first filter is located upstream of the second filter, wherein the first filter is located upstream of a downstream end of the fluid flow passageway and wherein the second filter is located in the second tank;

a conduit extending into the first tank, the conduit having a first open end adjacent the top of the first tank and a second open end in fluid flow communication with a lower portion of the first tank, the conduit passing through the second tank and defining an inner wall of the second tank; and a relief port in an upper portion of the conduit for fluid flow communication between the conduit and an upper portion of the second tank located between the second filter and the outlet to allow liquid to flow from the first tank up through the conduit and into the second tank via the relief port, bypassing the second filter, in the event of a blockage in the device.

2. The device of claim 1, wherein the vortex facilitating formation is selected from the group consisting of: a vane extending into the first tank; and a groove or scallop formation in a sidewall of one of the first and second tanks.

3. The device of claim 2, wherein the inlet directs inflowing liquid toward the vortex facilitating formation.

4. The device of claim 1, wherein the fluid flow passageway comprises an opening in a wall between the first and second tanks.

5. The device according to claim 4, wherein the base of the second tank comprises a portion that slopes toward the fluid flow passageway to facilitate backflow into the first tank of materials that settle on the base of the second tank.

6. The device of claim 1, comprising one or more magnetic separator located in one or more of: the first tank; the second tank; and both the first and second tanks.

7. The device of claim 1, comprising one or more porous housing containing a ferric metal for generating ferrous oxide (FeO), the porous housing being located in the hydraulic circuit.

8. A method of improving water quality, comprising:
directing a stream of water for treatment into the inlet of the device of claim 1.

9. The method of claim 8, wherein an inner wall of said other of said first and second tanks is defined by said one of said first and second tanks, wherein said one of said first and second tanks is the second tank and said other of said first and second tanks is the first tank, wherein a base of the second tank is spaced above a base of the first tank, the device comprising a conduit extending into the first tank, the conduit having a first open end adjacent the top of the first tank and a second open end in fluid flow communication with a lower portion of the first tank, the method further comprising extracting, through the conduit, contaminants that settle on the base of the first tank.

10. The device of claim 9, wherein the porous housing is located in the second tank.

11. The device of claim 1, wherein one of the one or more hydrocarbon traps is located in a fluid flow path between the inlet and the relief port.

* * * * *

UNITED STATES PATENT AND TRADEMARK OFFICE
CERTIFICATE OF CORRECTION

Page 1 of 1

PATENT NO. : 11,167,223 B2
APPLICATION NO. : 16/625215
DATED : November 9, 2021
INVENTOR(S) : David Sparke It is certified that error appears in the above-identified patent and that said Letters Patent is hereby corrected as shown below:

On the Title Page

In Column 1, item (73), Assignee, Line 1, delete "Pty," and insert -- Pty. --.

In the Specification

In Column 2, Lines 11-13, delete "wherein the . . . the liquid." and insert the same in Column 2, Line 12, as a new paragraph.

In the Claims

In Column 10, Line 25, Claim 10, delete "9," and insert -- 7, --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*